United States Patent
Nakashima

(10) Patent No.: US 7,632,564 B2
(45) Date of Patent: Dec. 15, 2009

(54) LIQUID COMPOSITION FOR METACHROMATIC MEMBERS, AND METACHROMATIC MEMBER SET MAKING USE OF THE SAME

(75) Inventor: Akio Nakashima, Tushima (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 318 days.

(21) Appl. No.: 10/968,928

(22) Filed: Oct. 21, 2004

(65) Prior Publication Data

US 2005/0260362 A1 Nov. 24, 2005

(30) Foreign Application Priority Data

May 24, 2004 (JP) ............................. 2004-152766

(51) Int. Cl.
*B32B 3/26* (2006.01)
*B32B 9/00* (2006.01)

(52) U.S. Cl. ................................. 428/304.4; 428/318.4

(58) Field of Classification Search .............. 428/304.4, 428/318.4
See application file for complete search history.

(56) References Cited

U.S. PATENT DOCUMENTS 6,416,853 B1 7/2002 Nakashima et al. ...... 428/313.9

FOREIGN PATENT DOCUMENTS

| EP | 1 254 985 | 11/2002 |
|---|---|---|
| JP | 11-216272 | 8/1999 |

*Primary Examiner*—Victor S Chang
(74) *Attorney, Agent, or Firm*—Fitzpatrick, Cella, Harper & Scinto

(57) ABSTRACT

In a liquid composition for metachromatic members which is to be applied to a metachromatic member having a support and provided thereon a porous layer formed by fixing therein a low refractive index pigment in a disperse state together with a binder resin, the liquid composition has a liquid medium and dissolved and/or dispersed therein a solid matter having a refractive index of from 1.3 to 1.8. Also disclosed is a metachromatic member set having this liquid composition and a metachromatic member. The liquid composition for metachromatic members satisfies permanent preservability of images, having superior density retention and shape retention of images formed in the metachromatic member and being suitable for uses in which impressions of hands, feet and the like are taken and preserved or in which written images or stamped images are preserved.

14 Claims, No Drawings

LIQUID COMPOSITION FOR METACHROMATIC MEMBERS, AND METACHROMATIC MEMBER SET MAKING USE OF THE SAME

This application claims the benefit of Japanese Patent Application No. 2004-152766 which is hereby incorporated by reference.

BACKGROUND OF THE INVENTION

1. Field of the Invention

This invention relates to a liquid composition for metachromatic members, and a metachromatic member set making use of the composition. More particularly, it relates to a liquid composition for metachromatic members which is used to form desired images on metachromatic members, and a metachromatic member set making use of the composition.

2. Related Background Art

Conventionally, as an attempt to form images on metachromatic members, a doll- or animal-shaped toy set is disclosed which comprises a doll- or animal-shaped toy and a water-metachromatic member comprising a support and provided thereon a porous layer formed by fixing therein a low refractive index pigment in a disperse state together with a binder resin (see, e.g., Japanese Patent Application Laid-open No. 11-216272).

In the above doll- or animal-shaped toy set, any desired portion of a doll- or animal-shaped toy in a liquid-absorbed state is pressed against the surface of the water-metachromatic member to make the porous layer permeated with water and turn transparent or semitransparent so as to make an image visible. The toy has the repetition utility that, upon evaporation of the liquid having permeated the porous layer, the porous layer returns to the original state and the image comes invisible.

It is also disclosed therein that water is preferably applied as a medium which makes the toy liquid-absorbed and that, in order to control drying speed to elongate image visual time, a water-soluble organic solvent such as propylene glycol may be mixed in a very small quantity.

However, the image formed in the water-metachromatic member constituted as described above is one which turns invisible upon evaporation of the water and, even when the water-soluble organic solvent such as propylene glycol is added, the image visual time is a little elongated at best.

Hence, such a means is unsuitable for uses in which images are permanently formed and preserved, e.g., uses in which impressions of hands, feet and the like of infants are taken and preserved. Accordingly, a liquid composition suited for the preservation of images has eagerly been awaited.

SUMMARY OF THE INVENTION

As a result of extensive studies made on liquid compositions to be applied to metachromatic members in which images can be formed by the aid of a medium, the present invention is to provide a liquid composition for metachromatic members which makes use of specific solid particles in the state they are dispersed in a liquid medium, so as to be able to satisfy permanent preservability of images, having superior lasting retention of images formed and being suitable for uses in which impressions of hands, feet and the like are taken and preserved or in which written images or stamped images are preserved.

The present invention is a liquid composition to be applied to a metachromatic member comprising a support and provided thereon a porous layer formed by fixing therein a low refractive index pigment in a disperse state together with a binder resin, and a requisite for the invention is that the liquid composition is a liquid composition for metachromatic members which comprises a liquid medium and dissolved and/or dispersed therein a solid matter having a refractive index of from 1.3 to 1.8. It may be further requisites for the invention that the solid matter is contained in the liquid medium in an amount of 3.0% by weight or more, that the solid matter dispersed in the liquid medium has a particle diameter of 10 μm or less, that the liquid medium contains at least water, and that a solid matter is used which is soluble in water after the liquid medium has evaporated.

As a further requisite, the present invention is a metachromatic member set comprising the above liquid composition for metachromatic members and a metachromatic member.

The present invention can provide a liquid composition for metachromatic members which satisfies permanent preservability of images, having superior density retention and shape retention of images formed in the metachromatic member and being suitable for uses in which impressions of hands, feet and the like are taken and preserved or in which written images or stamped images are preserved.

DESCRIPTION OF THE PREFERRED EMBODIMENTS

In the present invention, a liquid composition comprising a liquid medium and a solid matter dissolved and/or dispersed therein is made to adhere (i.e., applied) to a metachromatic member comprising a support and provided thereon a porous layer formed by fixing therein a low refractive index pigment in a disperse state together with a binder resin. The porous layer at the corresponding portion is permeated with the liquid medium and is turned transparent or semitransparent so as to make an image visible. Even after the liquid medium having permeated the porous layer has evaporated, the solid matter contained in the liquid composition remains, and hence the image is permanently visible.

As the liquid medium used in the liquid composition, water may preferably be used in view of safety and cost. Without limitation thereto, also usable is an organic solvent of various types or a mixture of an organic solvent of various types and water.

The organic solvent may be exemplified by:

hydrocarbons such as normal hexane, normal heptane, normal octane, normal nonane, normal decane, cyclohexane, methylcyclohexane, decalin, petroleum ether, petroleum benzene, ligroine, mineral spirit, liquid paraffin, benzene, toluene, xylene, o-xylene, m-xylene, p-xylene, p-cymene, solvent naphtha, tetrahydronaphthalene, α-pinene, terpene oil, mineral oils, and vegetable oils;

monohydric alcohols such as methyl alcohol, ethyl alcohol, normal propyl alcohol, isopropyl alcohol, normal butyl alcohol, isobutyl alcohol, secondary butyl alcohol, tertiary butyl alcohol, isoamyl alcohol, fusel oil, benzyl alcohol, cyclohexanol, and methyl cyclohexanol;

polyhydric alcohols and derivatives thereof, such as ethylene glycol, ethylene glycol monoacetate, ethylene glycol diacetate, ethylene glycol monomethyl ether, ethylene glycol monomethyl ether acetate, ethylene glycol monoethyl ether, ethylene glycol monoethyl ether acetate, ethylene glycol monoisopropyl ether, ethylene glycol monobutyl ether, ethylene glycol monoisoamyl ether, diethylene glycol, diethylene glycol monoacetate, diethylene glycol monoethyl ether, triethylene glycol, triethylene glycol monoethyl ether, propylene glycol, butylene glycol, glycerol, polyglycerol, acetic monoglyceride, acetic diglyceride, acetic triglyceride, and butyric monoglyceride;

ethers and acetals, such as ethyl ether, isopropyl ether, butyl ether, diisoamyl ether, phenyl methyl ether, phenyl ethyl ether, o-cresyl methyl ether, m-cresyl methyl ether, p-cresyl methyl ether, benzyl ethyl ether, diethylene oxide, cineole, furfural, furfural alcohol, furfural acetate, tetrahydrofurfural alcohol, formal, and acetal;

ketones such as acetone, acetone oil, methyl ethyl ketone, methyl isopropyl ketone, methyl butyl ketone, diacetone alcohol, acetophenone, cyclohexanone, methylcyclohexanone, and camphor;

esters such as methyl formate, ethyl formate, propyl formate, normal butyl formate, isobutyl formate, amyl formate, methyl acetate, ethyl acetate, propyl acetate, isopropyl acetate, normal butyl acetate, isobutyl acetate, secondary butyl acetate, amyl acetate, isoamyl acetate, benzyl acetate, cyclohexyl acetate, butyl propionate, isoamyl propionate, ethyl butyrate, butyl butyrate, isoamyl butyrate, isoamyl isovalerate, butyl stearate, amyl stearate, methyl benzoate, ethyl benzoate, propyl benzoate, isoamyl benzoate, benzyl benzoate, ethyl cynnamate, ethyl adipate, butyl adipate, 2-ethylhexyl adipate, diisononyl adipate, di-2-hexyl adipate, di-n-octyl adipate, di-n-decyl adipate, dibutyl fumarate, diisobutyl fumarate, dibutyl maleate, bis(2-ethylhexyl) maleate, bis(2-ethylhexyl) azelate, dibutyl sebacate, bis(2-ethylhexyl) sebacate, bis(2-ethylhexyl) dodecanoate, tributyl acetylcitrate, tris(2-ethylhexyl) trimellitate, triethyl phosphate, tributyl phosphate, triphenyl phosphate, tricresyl phosphate, 2,2,4-trimethyl-1,3-pentanediol monoisobutyrate, 2,2,4-trimethyl-1,3-pentanediol diisobutyrate, ethyl lactate, butyl lactate, amyl lactate, ethyl oxyisobutyrate, dibutyl tartrate, tributyl citrate, methyl salicylate, diethyl oxalate, dibutyl oxalate, diethyl malonate, dimethyl phthalate, diethyl phthalate, dibutyl phthalate, diamyl phthalate, dinormal hexyl phthalate, dinormal octyl phthalate, and diisonoyl phthalate;

fatty acids and phenols, such as formic acid, acetic acid, acetic anhydride, and cresol; and nitrogen compounds such as aniline, o-toluidine, cyclohexylamine, pyridine, quinoline, acetonitrile, benzonitrile, nitrobenzene, and nitroanisole. Liquid paraffin, vegetable oils, and fatty acid esters such as adipates, and glycols such as propylene glycol and glycerol may preferably be used because of their superior safety compared with other organic solvents.

The solid matter to be dissolved or dispersed in the liquid medium is a substance which shows a solid state at 20° C., and one having a refractive index of from 1.3 to 1.8, and preferably from 1.4 to 1.7, is used so that it may remain in the porous layer to keep the image visible even after the liquid medium has dried up.

This is because the low refractive index pigment contained in the porous layer of the metachromatic member has a refractive index ranging from 1.4 to 1.7, and hence the solid matter having permeated the porous layer can provide the porous layer with good transparency as having the same refractive index as the low refractive index pigment, and can permanently show the effect of keeping the color tone of the underlying layer visible.

Thus, in virtue of the use of the above solid matter, the image formed in the metachromatic member can be preserved in the same shape and color tone as those at the initial stage even after lapse of time.

There are no particular limitations on the solid matter as long as it is organic matter or inorganic matter showing a solid state at 20° C. and has a refractive index in the range of from 1.3 to 1.8. As examples of such a substance, it may be exemplified by:

synthetic resins or oligomers, such as ionomer resin, aminopolyacrylamide resin, isobutylene resin, isobutylene-maleic anhydride copolymer resin, acrylonitrile-acrylate-styrene terpolymer resin, acrylonitrile-ethylene-styrene terpolymer resin, acrylonitrile-styrene copolymer resin, acrylonitrile-butadiene-styrene terpolymer resin, acrylonitrile-vinylidene chloride copolymer resin, acrylonitrile-polyethylene chloride-styrene terpolymer resin, butadiene-styrene-methyl methacrylate terpolymer resin, vinyl chloride resin, ethylene-propylene copolymer resin, ethylene-acrylate copolymer resin, ethylene-methacrylate copolymer resin, ethylene-vinyl chloride copolymer resin, vinyl chloride-propylene copolymer resin, vinyl chloride-vinylidene copolymer resin, ethylene-vinyl acetate copolymer resin, ethylene chloride-vinyl acetate copolymer resin, ethylene-vinyl acetate-vinyl chloride terpolymer resin, ethylene-vinyl alcohol copolymer resin, polyvinyl chloride resin, chlorinated polyethylene resin, chlorinated polypropylene resin, carboxyvinyl polymer resin, ketone resin, norbornene resin, polyamide resin, copolymer polyamide resin, polyamide-imide resin, methoxymethylated polyamide resin, polycarbonate resin, polybutadiene resin, polyethylene terephthalate resin, polybutylene terephthalate resin, polystyrene resin, high-impact polystyrene resin, styrene-maleic acid copolymer resin, acrylate-styrene copolymer resin, polyacetal resin, polyvinyl formal resin, polyvinyl butyral resin, polyarylate resin, polyether imide resin, polyether resin, polyethylene resin, polypropylene resin, polymethylstyrene resin, acrylate resin, vinyl acetate-acrylate copolymer resin, styrene-acrylate copolymer resin, polyvinyl acetate resin, polymethyl methacrylate resin, epoxy acrylate resin, alkyl phenol resin, rosin-modified phenol resin, rosin-modified alkyd resin, phenol resin-modified alkyd resin, styrene-modified alkyd resin, epoxy-modified alkyd resin, acryl-modified alkyd resin, aminoalkyd resin, butyral resin, polyurethane resin, vinyl chloride-vinyl acetate copolymer resin, epoxy resin, alkyd resin, styrene-butadiene copolymer resin, unsaturated polyester resin, saturated polyester resin, vinyl chloride-acrylate copolymer resin, polyvinyl acetate resin, polyvinylidene chloride type copolymer resin, polyolefin type copolymer resin, rosin ester resin, polyisobutylene resin, isoprene rubber, butyl rubber, cyclized rubber, chlorinated rubber, polyvinyl alkyl ether resin, fluorine resin, silicone resin, phenol resin, petroleum type hydrocarbon resin, toluene resin, xylene resin, methacrylate type copolymer resin, melamine resin, urea resin, phenoxy resin, benzoguanamine resin, polyethylene oxide, polyethylene glycol, polyvinyl pyrrolidone, vinylpyrrolidone-vinyl acetate copolymer resin, vinylpyrrolidone-vinyl imidazole copolymer resin, vinylpyrrolidone-vinyl imidazole-methyl sulfate terpolymer resin, vinylpyrrolidone-sodium methacrylate copolymer resin, vinylpyrrolidone-vinylcaprolactam copolymer resin, polyvinyl pyrrolidone, polyvinyl caprolactam, polyvinyl pyrrolidone-vinylimidazole copolymer resin, polyvinyl alcohol, modified polyvinyl alcohol, polyacrylate, polymethacrylate, polyvinyl pyridine, polyacrylamide, polyethyleneimine, polyvinyl methyl ether, styrene-maleic anhydride copolymer resin, methyl vinyl ether-maleic anhydride copolymer resin, and polyphosphate;

cellulose derivatives such as cellulose acetate, cellophane, cellulose acetate propionate, cellulose acetate butyrate, nitrocellulose, methyl cellulose, ethyl cellulose, carboxymethyl cellulose, carboxymethyl ethyl cellulose, hydroxyethyl cellulose, and hydroxypropyl cellulose;

starch, and starch derivatives such as dialdehyde starch, carboxymethylated starch, hydroxyethylated starch, and starch phosphate;

natural products or semisynthetic resins, such as dextrin, gelatin, glue, rosin, shellac, casein, sodium caseinate, carnauba wax, alginic acid, sodium alginate, propylene glycol alginate, collagen, elastin, gum arabic, ester gum, guar gum, glycyrrhizin, copal rubber, tragacanth gum, dammar rubber, locust bean gum, Japanese gall, gall, tannic acid, hyaluronic acid, camphor, synthetic camphor, lactose, D-glucose, pectin, polyphenol, beeswax, japan wax, gallic acid, and pyrogallol;

solid fats and oils such as coconut oil, palm oil, beef tallow, hardened oil, higher fatty acids, higher alcohols, fatty esters, oxy acid esters, polyhydric alcohol fatty esters, and alkyl glyceryl ether fatty esters;

surface-active agents such as fatty acid soap, N-acylamino acid salts, polyoxyethylene carboxylates, polyoxyethylene alkyl ether carboxylates, acylated peptides, alkyl sulfonates, alkylbenzene sulfonates, alkylnaphthalene sulfonates, naphthalene sulfonate-formalin condensation products, melamine sulfonate-formalin condensation products, dialkyl sulfosuccinate salts, disalt alkyl sulfosuccinate, polyoxyethylene alkyl sulfosuccinates, alkyl sulfoacetates, α-olefin sulfonates, N-acyl-N-methyl taurine salts, sodium dimethyl-5-sulfoisophthalate, sulfonated oil, alkyl sulfates, secondary higher alcohol sulfate salts, polyoxyethylene alkyl ether sulfates, polyoxyethylene fatty acid alkanolamide sulfates, polyoxyethylene alkyl phenyl ether sulfates, monogly sulfate, fatty acid alkyl amide sulfates, polyoxyethylene alkyl ether phosphates, polyoxyethylene alkyl phenyl ether phosphates, alkyl phosphates, aliphatic amine salts, aliphatic quaternary ammonium salts, benzalkonium chloride, benzethonium chloride, pyridinium salts, imidazolinium salts, alkyldimethyl betaine, aminocarboxylates, imidazolinium betaine, lecithin, lecithin derivatives, alkylamine oxides, polyoxyethylene alkyl ethers, polyoxyethylene secondary alcohol ethers, polyoxyethylene alkyl phenyl ethers, polyoxyethylene sterol ethers, polyoxyethylene lanolin derivatives, alkylphenol formalin condensation product ethylene oxide derivatives, polyoxyethylene polyoxypropylene block copolymer, polyoxyethylene polyoxypropylene alkyl ethers, polyoxyethylene glycerol fatty esters, polyoxyethylene caster oil, polyoxyethylene sorbitan fatty esters, polyoxyethylene sorbitol fatty esters, polyoxyethylene glycol fatty esters, ethylene glycol fatty esters, glycerol fatty esters, polyglycerol fatty esters, sorbitan fatty esters, propylene glycol fatty esters, fatty acid alkanolamides, polyoxyethylene fatty acid amides, polyoxyethylene alkylamines, fluoroalkyl carboxylates, disodium N-perfluorooctane sulfonylglutamate, sodium 3-[fluoroalkyloxy]-1-alkylsulfonates, sodium 3-[ω-fluoroalkanoyl-N-ethylamino]-1-propanesulfonates, N-[3-(perfluorooctane sulfonamide)propyl]-N,N-dimethyl-N-carboxymethylene ammonium betaine, perfluoroalkylcarboxylic acids, perfluorooctanesulfonic acid diethanolamide, perfluoroalkyl sulfonates, N-propyl-N-(2-hydroxyethyl) perfluorooctane sulfonamide, perfluoroalkyl-N-ethylsulfonyl glycine salts, bis (N-perfluorooctylsulfonyl-N-ethylaminoethyl) phosphate, monoperfluoroalkyl ethyl phosphates, polyoxyethylene allyl glycidyl nonyl phenyl ether sulfate salts, polyoxyethylene allyl glycidyl nonyl phenyl ether, polyoxyethylene nonyl propenyl phenyl ether, and polyoxyethylene nonyl propenyl phenyl ether sulfate ammonium salt;

polysaccharides such as starch sugar, dextran, xanthan rubber, curdlan, pullulan, cycloamylose, chitin, chitosan, hyaluronic acid, and condroitin sodium sulfate;

glycosides such as D-glucitol, mannitol, maltitol, inositol, phytic acid, and arbutin;

vitamins such as vitamin A, vitamin B1, vitamin B2, vitamin B6, vitamin B12, vitamin C, calcium ascorbate, vitamin D, vitamin E, vitamin F, vitamin G, vitamin H, vitamin K, vitamin L, vitamin M, vitamin P, vitamin R, vitamin S, vitamin T, vitamin U, vitamin V, vitamin W, vitamin X, vitamin Y, pantothenic acid, nicotinic acid, lipoic acid, and lipoamide;

amino acids such as L-aspartic acid, L-aspartates, D-aspartic acid, DL-alanine, L-alanine, D-alanine, β-alanine, L-arginine, L-isocyanine, glycine, L-glutamine, L-glutamic acid, L-cystine, L-cystine derivatives, L-threonine, L-serine, L-tyrosine, L-tryptophan, L-valine, L-histidine, L-phenylalanie, L-proline, DL-methionine, L-methionine, L-lysine, L-leucine, glycylglycine, glutathione, oxygen convertible glutathione, γ-aminobutyric acid, e-aminocaproic acid, L-ornithine hydrochloride, and L-citrulline;

hormones such as cortisone, testosterone, thyroxine, adrenaline, and insulin;

nucleic acids and lipids, such as adenine, adenosine, 5'-adenylic acid, 3',5'-cyclic adenylic acid, sodium adenosine triphosphate, 6-allyladenine, 6-benzyladenine, 6-allyladenosine, 6-benzyladenosine, adenosine, deoxyadenosine monophosphate, guanine, guanosine, sodium gualylate, dioxyguanosine monophosphate, uracil, uridine, disodium 5'-uridylate, dioxyuridine, 5'-iododioxyuridine, uridine-5'-diphosphate glucose, orotic acid, cytosine, cytidine, 5'-cytidylic acid, cytidine 5'-triphosphate, dioxycytidine monophosphate, cytidine 5'-diphosphate choline sodium salt, arabinosyl cytosine, pipoxanthine, inosine, sodium 5'-inosinate, 6-mercaptopurine, 6-methylmercaptopurine, nicotinamide mononucleotide, nicotinamide adenine dinucleotide, nicotinamide adenine dinucleotide reduced-type sodium salt, nicotinamide adenine dinucleotide phosphate, nicotinamide adenine dinucleotide phosphate reduced-type sodium salt, cholesterol, and γ-orizanol; and other substances such as urea, N,N'-ethylenebis(stearamide), oleic acid amide, stearic acid amide, N,N'-methylenebis(stearamide), methylol stearamide, potassium stearate, sodium stearate, CTU (3,9-bis(2-cyanoethyl)-2,4,8-10-tetraoxaspiro[5,5]-undecane), CTU guanamine (3,9-bis[2-(3,5-diamino-2,4,6-triazaphenyl)ethyl]-2,4,8,10-tetraoxaspiro[5,5]-undecane), sebacic acid, dodecanedioic acid, dodecanedioic acid dihydrazide, pentaerythritol, malonic acid, itaconic anhydride, maleic anhydride, acetanilide, acetoacetanilide, p-aminoacetanilide, isophthalic acid, dimethyl terephthalate, 4,4'-dimethoxybenzophenone, diphenylacetic acid, diphenylsulfone, dimethyl terephthalate, hydrogenated bisphenol A, bisphenol A, bis(4-hydroxyphenyl) sulfone, p-hydroxybenzoic acid, stearyl gallate, laurone, and stearone.

As the inorganic matter, it may also be exemplified by calcium chloride, sodium chloride, sodium silicate, bleaching powder, disodium carbonate, soda lime, aluminum silicate, aluminum sulfate, ammonium alum, ammonium sulfate, calcium carbonate, and colloidal silica.

The solid matter contained in the liquid medium may be in an amount of 3.0% by weight or more, and preferably from 3.0 to 90.0% by weight. If it is in an amount of less than 3.0% by weight, the liquid composition may have poor performance of forming clear images. It is in an amount of more than 90.0% by weight, the liquid composition may have a high viscosity depending on the solid matter to be used, to tend to damage its initial-stage performance of forming images.

In order to make the solid matter permeate the porous layer efficiently, the solid matter used may also be one having particle diameter of 10 μm or less, and preferably from 0.01 μm to 10 μm.

It is difficult for the solid matter to be finely dispersed in the size of less than 0.01 μm. If on the other hand the solid matter has particle diameter of more than 10 μm, the solid matter particles may enter the voids of the porous layer with difficulty, and may stick to the surface of the porous layer to make it difficult to form clear images.

Incidentally, one which is soluble in water may be used as the solid matter. In such a case, the image formed by applying the liquid composition to the metachromatic member and made permanent by the solid matter upon evaporation of the liquid medium can be removed by washing the image with water. Hence, this is practical because the metachromatic member can repeatedly be used without discarding the metachromatic member if the image has come unnecessary or you have failed to form the image as desired.

In addition, after an impression of the hand or foot has been taken, any solid matter having adhered to the hand or foot can easily be washed away with water.

The metachromatic member comprises a support and provided thereon a porous layer formed by fixing therein a low refractive index pigment in a disperse state together with a binder resin. The porous layer absorbs the liquid composition to turn transparent or semitransparent to keep the color tone of the underlying layer visible.

The support of the metachromatic member may be made of any material without any particular limitations as long as it has water resistance, which material may include synthetic paper, cloth, film, plastic, rubber, synthetic leather, glass, ceramic, wood, and stone.

Even a material having poor water resistance as exemplified by woodfree paper, art paper or coated paper may also be used as the support after it has been made water-resistant by laminating a film thereto or coating or impregnating it with a resin.

As a form, the support may preferably have smooth surface, but may also have uneven surface.

Where an application implement (such as a coating implement or a stamping implement) used when the liquid composition is made to adhere (applied) to the porous layer is relatively hard, the support may also be formed of a material having flexibility or elasticity as exemplified by cloth, rubber or a foam having closed cells, in order to elastically receive the pressure coming when the application implement is put into contact, to allow the liquid composition to permeate the porous layer to form a sharper image. Also, even where the support is one formed of a material having poor elasticity as exemplified by synthetic paper, it may be provided as its underlying layer with a layer having flexibility or elasticity, whereby a sharp image can be formed.

The porous layer formed on the support is a layer formed by fixing therein a low refractive index pigment in a disperse state together with a binder resin.

As the low refractive index pigment, it may include fine-particle silica, baryte powder, precipitated barium sulfate, barium carbonate, precipitated calcium carbonate, gypsum, clay, talc, alumina white, and basic magnesium carbonate. These have refractive index in the range of from 1.4 to 1.7, and show a good transparency when it absorbs the liquid composition.

There are no particular limitations on the particle diameter of the low refractive index pigment. Preferably used are those of from 0.03 μm to 10.0 μm in particle diameter.

Two or more of the low refractive index pigment may also be used in combination.

Incidentally, as a low refractive index pigment preferably usable, it may include fine-particle silica.

The fine-particle silica is produced as amorphous silica, having no specific shape. Depending on its production process, it is roughly grouped into one produced by a dry process making use of vapor phase reaction, e.g., thermal decomposition of silicon halide such as silicon tetrachloride (hereinafter "dry-process fine-particle silica") and one produced by a wet process making use of liquid phase reaction, e.g., decomposition of sodium silicate or the like in the presence of an acid (hereinafter "wet-process fine-particle silica"), any of which may be used. Where the wet-process fine-particle silica is used, it can provide a larger hiding power in a normal state than a system of the dry-process fine-particle silica. Hence, the mixing proportion of the binder resin in respect to the fine-particle silica can be made larger, and the porous layer can be improved in film strength. Accordingly, the wet-process fine-particle silica may more preferably be used.

As stated above, the wet-process fine-particle silica is preferred as a fine-particle silica which is used to satisfy the hiding power of the porous layer in a normal state. The reason therefor is presumed as follows: The dry-process fine-particle silica and the wet-process fine-particle silica differ in structure. The dry-process fine-particle silica forms a three-dimensional structure in which the silica has closely joined, whereas the wet-process fine-particle silica has what is called a two-dimensional structure in which the silica has condensed to form a long molecular arrangement. Therefore, it has coarser molecular structure than the dry-process fine-particle silica, and hence, when the wet-process fine-particle silica is used in the porous layer, has superior properties of irregular reflection of light in a dry condition. Thus, it can provide the porous layer with a large hiding power in a normal state.

It is also desirable that the low refractive index pigment to be incorporated in the porous layer has an appropriate hydrophilicity, because the liquid medium with which the liquid composition is permeated is chiefly water in view of safety and cost. Accordingly, the wet-process fine-particle silica may preferably be used because, in the wet-process fine-particle silica, hydroxyl groups present on the particle surfaces as silanol groups are present in a larger number than in the dry-process fine-particle silica and hence the former has a higher hydrophilicity than the latter.

In the case when the wet-process fine-particle silica is used as the low refractive index pigment, in order to satisfy both the hiding power in a normal state and the transparency in a liquid-absorbed state, it may preferably be used in a coverage of from 1 $g/m^2$ to 30 $g/m^2$, and more preferably from 5 $g/m^2$ to 20 $g/m^2$, which depends on the type, particle diameter, specific surface area, oil absorption and so forth of the wet-process fine-particle silica. If it is in a coverage of less than 1 $g/m^2$, it is difficult to attain a sufficient hiding power in a normal state. If on the other hand it is in a coverage of more than 30 $g/m^2$, it is difficult to attain a sufficient transparency in a liquid-absorbed state (at the time of water absorption).

The low refractive index pigment is dispersed in a vehicle containing the binder resin as a binding agent, and the support is coated thereon with the dispersion obtained, followed by removal of its volatile matter by drying to form the porous layer.

As the binder resin, it may include urethane type resin, nylon resin, vinyl acetate resin, acrylate resin, acrylate copolymer resin, acrylic polyol resin, vinyl chloride-vinyl acetate copolymer resin, maleic acid resin, polyester resin, styrene resin, styrene copolymer resin, polyethylene resin, polycarbonate resin, epoxy resin, styrene-butadiene copolymer resin, acrylonitrile-butadiene copolymer resin, methyl methacrylate-butadiene copolymer resin, butadiene resin, chloroprene resin, melamine resin, and resin emulsions of any of these, as well as casein, starch, cellulose derivatives, polyvinyl alcohol, urea resin, phenol resin, and epoxy resin.

The porous layer contains the binder resin in a small mixing proportion to the colorant low refractive index pigment, compared with conventionally known general coating films, and hence a sufficient film strength may be attained with difficulty. Accordingly, in uses in which resistance to scratching is required, it is preferable that the urethane type resin or nylon resin is used as the binder resin or the binder resin contains at least such a resin resin.

As the urethane type resin, it includes polyester type urethane resin, polycarbonate type urethane resin, and polyether type urethane resin, two or more of which may also be used in combination. Also usable are a urethane type emulsion resin in which the above resin stands emulsion-dispersed in water, and a colloid-dispersed type (ionomer type) urethane resin in which urethane resin having ionic properties (urethane ionomer) stands dissolved or dispersed in water by self-emulsification without requiring any emulsifier in virtue of its own ionic groups.

Incidentally, any of a water base urethane type resin and an oil base urethane type resin may be used as the urethane type resin. Preferably uses is the water base urethane type resin, in particular, a urethane type emulsion resin or a colloid-dispersed type urethane type resin.

The urethane type resin may be used alone, and may also be used in combination with other binder resin in accordance with the type of the support and the performance to be required. In the case when a binder resin other than the urethane type resin is used in combination, in order to attain a practical film strength, the urethane type resin may preferably be incorporated in the binder resin of the porous layer in a proportion of 30% or more in solid matter weight ratio. In the binder resin, some cross-linkable one may be cross-linked with addition of any desired cross-linking agent to further improve the film strength.

In the binder resin, some have a large affinity for the liquid medium, and some a small one. Combination of these enables control of the time of permeation into the porous layer, the extent of permeation into it and the speed of drying after permeation. Further, appropriate addition of a dispersing agent also enables control of the performance of permeation stated above.

The porous layer may be formed by any conventionally known method, e.g., a printing means such as screen printing, offset printing, gravure printing, coater printing, padding, or transfer printing, and other means such as brush coating, spray coating, electrostatic coating, electrodeposition coating, curtain coating, roller coating, or dip coating.

A metalescent pigment such as conventionally known titanium dioxide coated mica, iron oxide-titanium dioxide coated mica, iron oxide coated mica, guanine, sericite, basic lead carbonate, acid lead arsenate or bismuth oxychloride may further be added to the porous layer or any general dye or pigment may be added thereto so that color variations can be diverse.

The metachromatic member formed as described above may optionally be provided with a non-metachromatic layer, using a non-metachromatic ink containing a general dye or pigment or a fluorescent dye or pigment, or may optionally be provided with a metalescent layer by coating it with an ink containing a metalescent pigment such as titanium dioxide coated mica, iron oxide-titanium dioxide coated mica, iron oxide coated mica, guanine, sericite, basic lead carbonate, acid lead arsenate or bismuth oxychloride.

Incidentally, the non-metachromatic layer may be provided as an underlying layer of the porous layer so as to be viewable when he porous layer turns transparent or semi-transparent upon absorption of water. Such constitution may preferably be used.

Inasmuch as the non-metachromatic layer is provided as an underlying layer of the porous layer, a metachromatic member can be obtained which shows superior color variations between the dry state and the water-absorbed state. Also, where the non-metachromatic layer is formed as a layer having patterns, characters, symbols, figures or the like, a metachromatic member can be obtained which is richer in variations.

In constituting the metachromatic member described above, it may also appropriately be provided with a protective layer or a light stabilizer layer. Stated specifically, the light stabilizer layer is a layer in which a light stabilizer(s) selected from an ultraviolet absorber, an antioxidant, an age resistor, a singlet oxygen quencher, a superoxide anion quencher, an ozone quencher, a visible-light absorber and an infrared absorber is/are fixed in a disperse state.

Incidentally, an age resistor, an antistatic agent, a polarity-providing agent, a thixotropy-providing agent and/or an anti-foaming agent may optionally be added to the respective layers to improve their function.

As methods by which the liquid composition is made to adhere (applied) to the porous layer, available are a method in which a finger is wetted in the liquid composition and then put into touch with the metachromatic member, a method in which a coating implement having a writing brush or a fibrous pen member at the tip, or a sponge, is soaked with the liquid composition and then put into touch with the metachromatic member, a method in which a container holding therein the liquid composition is brought into proximity to or contact with the metachromatic member and then the liquid composition is led out of the container to make the former adhere to the metachromatic member, a method in which a stamp to the stamp face of which a foam having open cells or closed is fixed is soaked with the liquid composition to make it adhere to the metachromatic member, and a method in which the liquid composition is made to adhere to a stamp the plastic or rubber stamp face of which has been formed in rough surface, and the stamp is brought into contact with the metachromatic member.

Incidentally, as the method in which a container holding therein the liquid composition is brought into proximity to or contact with the metachromatic member and then the liquid composition is led out of the container to make the former adhere to the metachromatic member, available is, e.g., a method in which the liquid composition is held in the container and also a fibrous member or a brush through which the liquid composition held in the container is to be led out is provided so that the metachromatic member is coated with the liquid composition, a method in which the liquid composition is held in the container and also a sprayer is provided so that the liquid composition is sprayed on the metachromatic member, or a method in which the liquid composition held in the container is pressurized like a syringe so that the liquid composition is spouted out of it.

In addition, where an impression of a hand or foot of an infant or doll is taken, the hand or foot may be put into touch with i) a fibrous material or a foam (sponge) having open cells which has been soaked with the liquid composition or ii) a container holding therein a fibrous material or a foam (sponge) having open cells which has been soaked with the liquid composition to imitate a stamp pad. Thereafter, this hand or foot may be put into touch with the metachromatic member to take the impression of the hand or foot. Such a method is preferable, and enables formation of a clear impression of the hand or foot with ease.

EXAMPLES

The present invention is described below in greater detail by giving Examples. In the following Examples and Comparative Examples, "part(s)" refers to "part(s) by weight".

Examples 1 to 16

Preparation of Liquid Compositions for Metachromatic Members:

The solid matter used in each liquid composition for metachromatic members according to the present invention, the refractive index [the value at 20° C. in the sodium D line (589 nm)] of the solid matter, the liquid medium, and the state of the solid matter in the porous layer are shown in the following table. Incidentally, in regard to solid matter standing dispersed in the liquid medium, its particle diameter is also shown, Numerals in parentheses in the table indicate parts by weight.

TABLE 1

| Example: | Solid matter | Solid matter refractive index | Liquid medium | State of solid matter |
|---|---|---|---|---|
| 1 | Polyvinyl alcohol (10.0) available from The Nippon Synthetic Chemical Industry Co., Ltd. Trade name: GOSENOL GL-03 | 1.51 | Water (90.0) | Dissolved state |
| 2 | Water-soluble nylon resin (20.0) available from Teikoku Chemical Industry Co., Ltd. Trade name: TRESIN FS350 | 1.53 | Water (40.0) Ethyl alcohol (40.0) | Dissolved state |
| 3 | Acrylic copolymer resin (43.0) available from Clariant Polymer Co., Ltd. Trade name: MOVINYL 9000 | 1.50 | Water (57.0) | Disperse state, 0.1 to 0.2 μm |
| 4 | Acrylic styrene copolymer resin (50.0) available from Clariant Polymer Co., Ltd. Trade name: MOVINYL 870 | 1.51 | Water (50.0) | Disperse state, 0.1 to 0.2 μm |
| 5 | Urethane resin (40.0) available from Avesia Ltd. Trade name: NEOCRYL R-967 | 1.50 | Water (60.0) | Disperse state, 0.05 μm |
| 6 | Polyethylene glycol (40.0) available from Sanyo Chemical Industries, Ltd. | 1.48 | Water (40.0) Ethylene glycol (20.0) | Dissolved state |
| 7 | Polyvinyl pyrrolidone (40.0) available from BASF Corp. Trade name: RUBISCOL K30 | 1.50 | Water (60.0) | Dissolved state |
| 8 | Cyclodextrin (50.0) available from Nikken Chemicals Co., Ltd. Trade name: ISOELITE P | 1.47 | Water (50.0) | Dissolved state |
| 9 | Styrene resin (50.0) available from Asahi Chemical Industry Co., Ltd. Trade name: STYRON 666 | 1.59 | Cyclohexanone (50.0) | Dissolved state |
| 10 | Acrylic resin (40.0) available from Mitsubishi Rayon Co., Ltd. Trade name: DIANAL B105 | 1.48 | Methyl iso-butyl ketone (60.0) | Dissolved state |
| 11 | Hydroxypropyl cellulose (10.0) available from Nippon Soda Co., Ltd. Trade name: HPC-SL | 1.48 | Water (99.0) | Dissolved state |
| 12 | Beef tallow (20.0) available from New Japan Chemical Co., Ltd. Trade name: Beef Tallow Extremely Hardened Oil | 1.46 | Xylene (80.0) | Dissolved state |
| 13 | Polyoxyethylene glycerol fatty ester (10.0) available from Nikko Chemicals Co., Ltd. Trade name: TMGS-5 | 1.47 | Water (45.0) Ethyl alcohol (45.0) | Dissolved state |
| 14 | Starch sugar (50.0) available from Nikken Chemicals Co., Ltd.; a reducing starch hydrolyzate. Trade name: S.E. 30 | 1.49 | Water (50.0) | Dissolved state |
| 15 | Sodium chloride (10.0) | 1.54 | Water (90.0) | Dissolved state |
| 16 | Bisphenol A (20.0) | 1.53 | Methyl ethyl ketone (80.0) | Dissolved state |

Comparative Examples 1 to 4

Preparation of Liquid Compositions for Metachromatic Members:

Liquid mediums used in liquid compositions for metachromatic members of Comparative Examples are shown in the following table.

TABLE 2

| Comparative Example: | Liquid medium | Liquid medium refractive index |
|---|---|---|
| 1 | Water (100.0) | 1.33 |
| 2 | Water (50.0) Propylene glycol (50.0) | 1.39 |
| 3 | Propylene glycol (100.0) | 1.43 |
| 4 | Liquid paraffin (100.0) available from Matsumura Oil Research Corp. Trade name: MORESCO WHITE P350 | 1.47 |

Production of Metachromatic Member:

On white synthetic paper (size: 100 mm×100 mm; thickness: 80 μm), a blue screen printing ink prepared by uniformly mixing and stirring 5 parts of a blue pigment, 50 parts of an acrylate emulsion (solid content: 50%), 0.2 part of a silicone type anti-foaming agent, 3 parts of a thickening agent, 2 parts of a wetting agent, 1 part of a leveling agent, 10 parts of water and 2.5 parts of an epoxy type cross-linking agent was printed all over the surface using a 180-mesh screen plate to form a non-metachromatic layer. Next, on the non-metachromatic layer, a white screen printing ink prepared by uniformly mixing and stirring 15 parts of wet-process fine-particle silica (trade name: NIPSIL E-200A; available from Tosoh Silica Corporation) as a low refractive index pigment, 50 parts of water base urethane resin (trade name: HYDRAN AP-10; polyester type urethane resin; solid content: 30%; available from Dainippon Ink & Chemicals, Incorporated) as a binder resin, 30 parts of water, 0.5 part of a silicone type anti-foaming agent, 3 parts of a water base ink thickening agent, 1 part of ethylene glycol and 2 parts of an epoxy type cross-linking agent was solid-printed, followed by drying at 70° C. for 15 minutes to effect curing to form a porous layer. Thus, a metachromatic member was obtained.

Density retention test and shape retention test on metachromatic images:

0.1 g each of the liquid compositions for metachromatic members prepared in Examples and Comparative Examples was collected using a dropping pipette, and thereafter dropped on the metachromatic member to form a blue metachromatic image on the metachromatic member. The density and shape of the image after leaving at 20° C. for a day, a week and three months were visually observed.

The test results are shown in the following tables.

TABLE 3

| Example: | 20° C., for a day | | 20° C., for a week | | 20° C., for 3 months | |
|---|---|---|---|---|---|---|
| | Density retention | Shape retention | Density retention | Shape retention | Density retention | Shape retention |
| 1 | A | AA | A | AA | A | AA |
| 2 | A | AA | A | AA | A | AA |
| 3 | A | AA | A | AA | A | AA |
| 4 | A | AA | A | AA | A | AA |
| 5 | A | AA | A | AA | A | AA |
| 6 | AA | AA | AA | AA | AA | AA |
| 7 | AA | AA | AA | AA | AA | AA |
| 8 | AA | AA | AA | AA | AA | AA |
| 9 | AA | AA | AA | AA | AA | AA |
| 10 | AA | AA | AA | AA | AA | AA |
| 11 | A | AA | A | AA | A | AA |
| 12 | A | AA | A | AA | A | AA |
| 13 | A | AA | A | AA | A | AA |
| 14 | A | A | A | A | A | A |
| 15 | B | AA | B | AA | B | AA |
| 16 | A | AA | A | AA | A | AA |

TABLE 4

| Comparative Example: | 20° C., for a day | | 20° C., for a week | | 20° C., for 3 months | |
|---|---|---|---|---|---|---|
| | Density retention | Shape retention | Density retention | Shape retention | Density retention | Shape retention |
| 1 | C | C | C | C | C | C |
| 2 | B | B | C | C | C | C |
| 3 | A | B | B | C | C | C |
| 4 | AA | B | A | C | C | C |

Evaluation criteria for the density retention and shape retention shown in the tables are as shown below.

Density Retention Test:

The density immediately after image formation was compared with the density after lapse of time, in respect of the density of blue color of the image formed by dropping on the metachromatic member the liquid composition for metachromatic members.

AA: Density does not change from that immediately after color development.

A: Density changes, but the image is viewable.

B: Density changes so greatly that the image is viewable with difficulty.

C: Color fades away completely, and the image is not viewable.

Shape Retention Test:

The shape immediately after image formation was compared with the shape after lapse of time, in respect of the shape of the image formed by dropping on the metachromatic member the liquid composition for metachromatic members.

AA: No change, compared with the initial shape.

A: A change is slightly seen.

B: The shape changes so greatly that the initial shape is not recognizable.

C: The shape is not recognizable.

Application Example 1

On white synthetic paper (size: 280 mm×280 mm; thickness: 200 μm), a blue screen printing ink prepared by uniformly mixing and stirring 5 parts of a blue pigment, 50 parts of an acrylate emulsion (solid content: 50%), 0.2 part of a silicone type anti-foaming agent, 3 parts of a thickening agent, 2 parts of a wetting agent, 1 part of a leveling agent, 10 parts of water and 2.5 parts of an epoxy type cross-linking agent was solid-printed all over the surface to form a non-metachromatic layer.

Next, on the non-metachromatic layer, a white screen printing ink prepared by uniformly mixing and stirring 15 parts of wet-process fine-particle silica (trade name: NIPSIL E-200A; available from Tosoh Silica Corporation) as a low refractive index pigment, 50 parts of water base urethane resin (trade name: HYDRAN AP-10; polyester type urethane resin; solid content: 30%; available from Dainippon Ink & Chemicals, Incorporated) as a binder resin, 30 parts of water, 0.5 part of a silicone type anti-foaming agent, 3 parts of a water base ink thickening agent, 1 part of ethylene glycol and 2 parts of an epoxy type cross-linking agent was solid-printed to form a porous layer. Thus, a metachromatic member was produced.

A urethane foam (diameter: 200 mm; thickness: 5 mm) having closed cells, serving as an absorbent material, was soaked with the liquid composition for metachromatic members which was prepared in Example 6, and this was placed in a circular container to make a stamp pad.

The metachromatic member was paired with the stamp pad to obtain a metachromatic member set.

The palm of an infant's hand was pressed against the absorbent material of the stamp pad for about 10 seconds to make the liquid composition adhere uniformly to the palm. Thereafter, this hand was pressed against the porous layer of the metachromatic member for about 5 seconds, whereupon the porous layer absorbed the liquid composition to turn transparent, thus a blue hand impression was taken which was visible in virtue of the underlying layer non-metachromatic layer.

The metachromatic member in which the hand impression was formed was left in an environment of 20° C. for 3 months, where it retained the same color density and shape as those at the initial stage, showing good preservation stability.

In addition, since the solid matter contained in the liquid composition for metachromatic members is soluble in water, the liquid composition having adhered to the hand of an infant when the hand impression is taken can easily be washed away with water. Besides, even when you have failed to take the hand impression as desired, the metachromatic member may be washed with water to remove such a hand impression completely, and a hand impression may be formed anew using the liquid composition. The metachromatic member satisfied such repetition utility.

Furthermore, since the liquid composition was colorless and transparent, it by no means made stains even when it adhered accidentally to clothes or the like, and was easily removable by water washing or the like. Thus, it also had good convenience and safety in taking infant's hand impressions.

Application Example 2

On a polyester sheet colored in blue (size: 200 mm×250 mm; thickness: 50 μm), a pink screen printing ink prepared by uniformly mixing and stirring 15 parts of wet-process fine-particle silica (trade name: NIPSIL E-74P; available from Tosoh Silica Corporation) as a low refractive index pigment, 2 parts of a pink fluorescent pigment, 50 parts of water base urethane resin (trade name: HYDRAN AP-10; polyester type urethane resin; solid content: 30%; available from Dainippon Ink & Chemicals, Incorporated) as a binder resin, 30 parts of water, 0.5 part of a silicone type anti-foaming agent, 3 parts of a water base ink thickening agent, 1 part of ethylene glycol and 2 parts of an epoxy type cross-linking agent was solid-printed all over the surface to form a pink-colored porous layer. Thus, a metachromatic member was produced which was capable of changing from pink to purple upon absorption of a liquid.

A cellulose nonwoven fabric of 40 g/m² in unit area weight and cut in a size of 150 mm×200 mm, serving as an absorbent material, was soaked with the liquid composition for metachromatic members which was prepared in Example 7, to make a liquid-absorption member.

The metachromatic member was paired with the liquid-absorption member to obtain a metachromatic member set.

The liquid-absorption member was uniformly pressed against the tread (undersurface) of an infant's foot to make the liquid composition adhere thereto uniformly. Thereafter, this foot was pressed against the porous layer of the metachromatic member for about 5 seconds, whereupon the porous layer absorbed the liquid composition to turn transparent, thus a purple foot impression was taken which was visible in virtue of the underlying layer non-metachromatic layer.

The metachromatic member in which the foot impression was formed was left in an environment of 20° C. for 3 months, where it retained the same color density and shape as those at the initial stage, showing good preservation stability.

In addition, since the solid matter contained in the liquid composition for metachromatic members is soluble in water, the liquid composition having adhered to the foot of an infant when the foot impression is taken can easily be washed away with water. Besides, even when you have failed to take the foot impression as desired, the metachromatic member may be washed with water to remove such a foot impression completely, and a foot impression may be formed anew using the liquid composition. The metachromatic member satisfied such repetition utility.

Furthermore, since the liquid composition was colorless and transparent, it by no means made stains even when it adhered accidentally to clothes or the like, and was easily removable by water washing or the like. Thus, it also had good convenience and safety in taking infant's foot impressions.

Application Example 3

On white coated paper (size: 300 mm×250 mm; thickness: 100 μm), a black screen printing ink prepared by uniformly mixing and stirring 5 parts of a black pigment, 50 parts of an acrylate emulsion (solid content: 50%), 0.2 part of a silicone type anti-foaming agent, 3 parts of a thickening agent, 2 parts of a wetting agent, 1 part of a leveling agent, 10 parts of water and 2.5 parts of an epoxy type cross-linking agent was solid-printed all over the surface to form a non-metachromatic layer.

Next, on the non-metachromatic layer, a white screen printing ink prepared by uniformly mixing and stirring 15 parts of wet-process fine-particle silica (trade name: NIPSIL E-200A; available from Tosoh Silica Corporation) as a low refractive index pigment, 50 parts of water base urethane resin (trade name: HYDRAN AP-10; polyester type urethane resin; solid content: 30%; available from Dainippon Ink & Chemicals, Incorporated) as a binder resin, 30 parts of water, 0.5 part of a silicone type anti-foaming agent, 3 parts of a water base ink thickening agent, 1 part of ethylene glycol and 2 parts of an epoxy type cross-linking agent was solid-printed to form a porous layer. Thus, a metachromatic member was produced which was capable of changing from white to black upon absorption of a liquid.

Where characters are written on this metachromatic member with a writing brush soaked with water, the member which is white turns black along the traces of writing, along which it takes on black in a liquid-absorbed state and the black traces returns to white upon evaporation of water to dryness. This phenomenon is repeatable over and over. Hence, the metachromatic member is suited for practice in calligraphy, but the handwriting can not be left.

On this metachromatic member, characters were written with a writing brush soaked with the liquid composition for metachromatic members which was prepared in Example 1. The handwriting thus obtained retained the same shape as that at the initial stage even when left in an environment of 30° C. for 3 months, and was viewable though changed in color density, showing good preservation stability.

In addition, since the liquid composition for metachromatic members is readily soluble in water, the liquid composition having remained in the writing brush after writing was easily washable away with water.

Furthermore, since the liquid composition was colorless and transparent, it by no means made stains even when it adhered accidentally to clothes or the like, and was easily removable by water washing or the like, showing good convenience.

Application Example 4

On a white nylon taffeta cloth as the support 2, a pink screen printing ink prepared by uniformly mixing and stirring 5 parts of a pink pigment, 50 parts of an acrylate emulsion (solid content: 50%), 0.2 part of a silicone type anti-foaming agent, 3 parts of a thickening agent, 2 parts of a wetting agent, 1 part of a leveling agent, 10 parts of water and 2.5 parts of an epoxy type cross-linking agent was solid-printed to form a non-metachromatic layer.

Next, on the non-metachromatic layer, a white screen printing ink prepared by uniformly mixing and stirring 15 parts of wet-process fine-particle silica (trade name: NIPSIL E-1011; available from Tosoh Silica Corporation) as a low refractive index pigment, 50 parts of water base urethane resin (trade name: PERMARIN UA-150; polyether type urethane resin; solid content: 30%; available from Sanyo Chemical Industries, Ltd.) as a binder resin, 30 parts of water, 0.5 part of a silicone type anti-foaming agent, 3 parts of a water base ink thickening agent, 1 part of ethylene glycol and 2 parts of a blocked isocyanate type cross-linking agent was solid-printed all over the surface using a 180-mesh screen plate, followed by drying at 130° C. for 5 minutes to effect curing to form a porous layer. Thus, a metachromatic member was produced which was capable of changing from white to pink upon absorption of a liquid.

A urethane foam (diameter: 200 mm; thickness: 5 mm) having closed cells, serving as an absorbent material, was soaked with the liquid composition for metachromatic members which was prepared in Example 8, and this was placed in a circular container to make a stamp pad.

The metachromatic member was paired with the stamp pad to obtain a metachromatic member set.

A stamp provided with a convex flower stamp face was pressed against the absorbent material of the stamp pad for about 10 seconds to make the liquid composition adhere uniformly to the stamp face. Thereafter, this stamp face was pressed against the porous layer of the metachromatic member for about 5 seconds, whereupon the porous layer absorbed the liquid composition to turn transparent, thus a pink flower pattern was taken which was visible in virtue of the underlying layer non-metachromatic layer.

The metachromatic member in which the flower pattern was formed was left in an environment of 20° C. for 3 months, where it retained the same color density and shape as those at the initial stage, showing good preservation stability.

In addition, since the liquid composition for metachromatic members is readily soluble in water, the liquid composition having remained on the stamp face after the image was formed was easily washable away with water.

Furthermore, since the liquid composition was colorless and transparent, it by no means made stains even when it adhered accidentally to clothes or the like, and was easily removable by water washing or the like, showing good convenience.

Application Example 5

On white coated paper (size: 300 mm×250 mm; thickness: 100 μm), a red screen printing ink prepared by uniformly mixing and stirring 5 parts of a red pigment, 50 parts of an acrylate emulsion (solid content: 50%), 0.2 part of a silicone type anti-foaming agent, 3 parts of a thickening agent, 2 parts of a wetting agent, 1 part of a leveling agent, 10 parts of water and 2.5 parts of an epoxy type cross-linking agent was solid-printed all over the surface to form a non-metachromatic layer.

Next, on the non-metachromatic layer, a white screen printing ink prepared by uniformly mixing and stirring 15 parts of wet-process fine-particle silica (trade name: NIPSIL E-74P; available from Tosoh Silica Corporation) as a low refractive index pigment, 50 parts of water base urethane resin (trade name: HYDRAN AP-10; polyester type urethane resin; solid content: 30%; available from Dainippon Ink & Chemicals, Incorporated) as a binder resin, 30 parts of water, 0.5 part of a silicone type anti-foaming agent, 3 parts of a water base ink thickening agent, 1 part of ethylene glycol and 2 parts of an epoxy type cross-linking agent was solid-printed to form a porous layer. Thus, a metachromatic member was produced which was capable of changing from white to red upon absorption of a liquid.

Where characters are written on this metachromatic member with a pen holding therein water, the member which is white turns red along the traces of writing, along which it takes on red in a liquid-absorbed state and the red traces returns to white upon evaporation of water to dryness. This phenomenon is repeatable over and over. Hence, the metachromatic member is suited for practice in lettering or the like, but the handwriting can not be left.

On this metachromatic member, letters were written with a pen holding therein the liquid composition for metachromatic members which was prepared in Example 10. The handwriting thus obtained retained the same color density and shape as those at the initial stage even when left in an environment of 20° C. for 6 months, showing good preservation stability.

What is claimed is:

1. A liquid composition to be applied to a metachromatic member comprising a support bearing a porous layer, said porous layer being formed by fixing therein a low refractive index pigment dispersed in a binder resin;
said liquid composition comprising a liquid medium having dissolved therein a solid matter having a refractive index of from 1.3 to 1.8, said solid matter being a solid at 20° C. and present in said liquid composition from 3-90% by weight.

2. The liquid composition for metachromatic members according to claim 1, wherein said liquid medium is aqueous.

3. The liquid composition for metachromatic members according to claim 1, wherein said solid matter remains soluble in water after the liquid medium has evaporated.

4. A metachromatic member set comprising the liquid composition for metachromatic members according to any one of claims 1, 2 or 3, and a metachromatic member.

5. The metachromatic member set according to claim 4, wherein said liquid composition for metachromatic members is-contained in a fibrous material or an open-cell foam.

6. The metachromatic member set according to claim 4, which comprises a writing, coating or stamping implement with which said liquid composition for metachromatic members is made to adhere to said metachromatic member.

7. The liquid composition according to any one of claims 1, 2 or 3, wherein said solid matter has a refractive index of 1.4 to 1.7.

8. The metachromatic member set according to claim 4, wherein said solid matter has a refractive index of 1.4 to 1.7.

9. The metachromatic member set according to claim 5, wherein said solid matter has a refractive index of 1.4 to 1.7.

10. The metachromatic member set according to claim 6, wherein said solid matter has a refractive index of 1.4 to 1.7.

11. A display method, comprising the steps of:
   selecting a metachromatic member comprising a support bearing a porous layer, said porous layer being formed by fixing therein a low refractive index pigment dispersed in a binder resin; and
   applying to said metachromatic member said liquid composition according to claim 1.

12. The method according to claim 11, wherein said liquid medium is aqueous.

13. The method according to claim 11, wherein said solid matter remains soluble in water after the liquid medium has evaporated.

14. The method according to any one of claims 11-13 wherein said solid matter has a refractive index of 1.4 to 1.7.

* * * * *